Patented June 22, 1954

2,681,907

UNITED STATES PATENT OFFICE 2,681,907

ISOLATION OF FLAVONOID COMPOUNDS

Simon H. Wender, Norman, Okla., assignor to the United States of America as represented by the United States Atomic Energy Commission No Drawing. Application April 22, 1952,
Serial No. 283,749

10 Claims. (Cl. 260—210)

My invention relates to a method of purifying flavonoids and more particularly to the recovery of quantities of substantially pure flavonoids from their naturally occurring source materials.

The flavonoid compounds comprise a very important class of plant pigments which are widely distributed in the vegetable kingdom. Interest is shown in a number of these compounds due to their vitamin-like action in increasing the resistance of blood capillaries to rupture. The term "vitamin P" is sometimes applied to flavonoids having this property. Rutin, a member of this class of plant pigments enjoys widespread use as a drug for blood vessel treatment. In addition, it is anticipated that flavonoids will be of use in the control of radiation injury, and considerable experimental effort is being expended in this direction.

There is, therefore, considerable demand for such types of compounds, for both practical and experimental purposes. Since they usually occur in trace quantities, the isolation of flavonoids in substantially-pure form and in relatively large quantity has been exceedingly difficult to achieve. Alcohol extracts of naturally occurring source materials have often been used in conjunction with subsequent crystallization procedures. However, alcohol also extracts many resinous-like materials which interfere with crystallization. Water extracts have sometimes been employed to avoid the latter disadvantage, but, because of the usual lesser solubilities of flavonoids in water, unusually large volumes of water are necessary, with subsequently costly evaporations. In addition, interfering inorganic ions and some sugars are often coextracted. Nevertheless, regardless of the solvent used, the steps necessary to obtain a relatively pure concentrate are usually complicated, and considerable flavonoid losses occur. In addition, a purification step often used in the isolation of flavonoids from natural products involves the preparation of the lead salt of the flavonoid. This precipitate is separated, then suspended in a solvent such as alcohol, and decomposed with hydrogen sulfide. The resulting lead sulfide precipitate is then separated from the remaining supernatant flavonoid solution. However, not only is the use of hydrogen sulfide disagreeable, but flavonoid losses are significant.

An object of my invention, therefore, is to provide an improved method for isolating flavonoid compounds.

Another object is to provide a method for isolating relatively large quantities of a flavonoid compound in substantially pure form.

Still another object is to provide an improved process for separating relatively pure flavonoids in concentrated form from the original solid source materials.

Further objects and advantages of my invention will be apparent from the following description.

In accordance with my invention, substantially pure flavonoids may be separated in relatively concentrated form from extraneous organic and inorganic impurities by preparing a water extract of same, contacting said water extract with a cation-exchange resin, separating the resulting flavonoid-depleted water extract from the resulting flavonoid-retaining resin and eluting the flavonoids retained on said resin with an organic solvent.

Using my invention, flavonoids in a highly dilute, voluminous water extract may readily be concentrated, via the ion-exchange resin, into a much smaller volume, in addition to being highly purified, to an unexpected degree, of sugars and scores of other impurities co-extracted by the water from the original source material. No evaporation, crystallization or involved additional steps are required. Furthermore, with the methods devised in this invention, the metallic salts of the flavonoids, such as the lead salts, can be decomposed and the metals removed by use of a cation-exchange resin, rather than by the prior art hydrogen sulfide step.

My invention may be satisfactorily utilized with substantially any impure aqueous solution of flavonoid compounds, including those resulting as intermediate steps in other flavonoid purification processes. Thus, for example, my method may be used either directly with aqueous extracts of portions of plants containing flavonoid type compounds or with solutions containing metal compounds of the flavonoids. In either case, the concentration of impurities in these solutions is usually considerably higher than the concentration of the flavonoids.

Table I, following, is illustrative of the flavonoid compounds which may be separated from extraneous impurities utilizing the methods herein described.

TABLE I

Flavonol aglycones

Gossypetin-3,3',4',5,7,8-hexahydroxyflavone
Kaempferol-3,4',5,7-tetrahydroxyflavone
Morin-2',3,4',5,7-pentahydroxyflavone
Nortangeretin-3,4',5,6,7-pentahydroxyflavone
Patuletin-3,3',4',5,7-pentahydroxy - 6 - methoxyflavone
Quercetagetin-3,3',4',5,6,7-hexahydroxyflavone
Quercetin-3,3',4',5,7-pentahydroxyflavone
Rhamnetin-3,3',4',5 pentahydroxy - 7 - methoxyflavone
Robinetin-3,3',4',5',7 pentahydroxyflavone

Flavonol glycosides

Gossypetin-8-glucoside of gossypetin
Gossypitrin-7-glucoside of gossypetin
Isoquercitrin-3-glucoside of quercetin
Quercemeritrin-7-glucoside of quercetin
Quercitrin-3-rhamnoside of quercetin
Robinin-3-robinoside of kaempferol
Rutin-3-rutinoside of quercetin
Xanthorhamnin-3-trirhamnoside of rhamnetin

Flavone aglycones

Acacetin-5,7-dihydroxy-4'-methoxyflavone
Apigenin-4',5,7-trihydroxyflavone
Auranetin-a pentamethoxyflavone
Chrysin-5,7-dihydroxyflavone
Genkwanin-4',5-dihydroxy-7-methoxyflavone
Isowogonin-5,8-dihydroxy-7-methoxyflavone
Norwogonin-5,7,8-trihydroxyflavone
Oroxylin A-5,7-dihydroxy-6-methoxyflavone
Wogonin-5,7-dihydroxy-8-methoxyflavone

Flavanone aglycones

Butin-3',4',7-trihydroxyflavanone
Hesperitin - 3',5,7 trihydroxy - 4' - methoxyflavanone
Homoeriodictyol - 4',5,7 - trihydroxy - 3' - methoxyflavanone
Liquiritiginin-4',7-dihydroxyflavanone

Flavanone glycosides

Hesperidin-7-rhamnoside of hesperitin
Naringin - 7 - rhamnoglucoside of 4',5,7 - trihydroxyflavanone
Neohesperidin-A rhamnosidoglucoside of hesperitin

Chalcones

"Hesperidin methyl chalcone"—a product obtained from the methylation of hesperidin chalcone
Phloretin - β - (p - hydroxyphenyl) phloropropiophenone

Related compounds

Esculetin-6,7-dihydroxycoumarin
Pomiferin - 5 - hydroxy - 3 - (3,4, - dihydroxyphenyl) - 8,8 - dimethyl - 6 - (3 - methyl - 2 - butenyl) - 4,8 - benzol(1,2 - b; 3,4 - b')di - pyran-4-one Such flavonoid compounds may be present in portions of certain plants, for example, locoweed leaves, grapes, crude potato extract and various plant roots and woods. To facilitate extraction of the flavonoid compounds, the flavonoid-containing portion of the plant is usually ground, by conventional means, into a finely divided state. The extracting liquid may initially comprise either an organic solvent or water. However, since an aqueous solution is preferred for contacting the resin with the extracted material, water is preferred for the extraction step. Occasionally, however, an organic solvent such as acetone or ethanol is required as a more drastic means of extracting the flavonoids. In either case, high temperature extraction, usually at the boiling point of the extracting liquid, is preferred. When an organic solvent is employed, at a relatively high temperature, to extract flavonoids from plant material, the organic solvent may be removed from the extraction liquor by evaporation (under vacuum, if necessary, to prevent decomposition of the flavonoids) and the resulting flavonoid-containing residue taken up with a relatively small volume of hot water, thus producing the desired aqueous solution for the subsequent ion-exchange step.

The ratio of extracting solvent to ground material is not critical, although an excess of solvent is generally preferred. Thus, suitable ratios are from about 25 liters to about 250 liters of solvent to approximately 1 kilogram of ground material (representing about 5 grams to about 25 grams of flavonoid values and an average of about 10 grams). However, where the extraction is one of normal difficulty, a ratio of about 125 liters of solvent to about each kilogram of comminuted material is generally preferred.

Obviously, in using a ground material such as mashed grapes, the already relatively large liquid volume contribution by the water in the grapes must be considered when selecting the volume of additional extracting solvent to be employed.

Any suitable filtration method may be utilized to separate supernatant flavonoid-containing extraction liquors from remaining solid residues. Sometimes filter paper filtration may be difficult due to clogging of the filter paper pores by the extract and, therefore, filter materials such as flannel, cheese cloth, muslin and nylon are preferred. Occasionally, more than one such material may be used consecutively, starting with the one containing the larger pore size and terminating with the one containing the smaller pore size.

Numerous suitable cation-exchange adsorbents are available for use with my invention. However, particularly advantageous results may be obtained by utilizing a weak acid cation-exchange resin in which the activity is principally due to carboxylic groups (e. g. commercially available in such forms as Amberlite IRC-50 manufactured by Rohm and Haas Co., Philadelphia, Pa. and Duolite Cation Selector CS-100 manufactured by chemical Process Co., San Francisco, California). Satisfactory results may be achieved with the sodium, potassium, or other forms of the resins. However, the hydrogen form is preferred. Although the quantity of resin required for optimum recovery of a flavonoid compound from extracting liquor is, of course, dependent upon the concentration of adsorbable materials in the flavonoid-containing extraction liquor, it is merely necessary that care be taken to supply enough resin capacity to prevent the breakthrough of the flavonoid compound from the resin before the adsorption step is completed. It is generally sufficient, for each kilogram of plant solid initially present, to use from about 1.5 liters to about 7.5 liters of comminuted resin (on a wet-settled basis) while an average preferred quantity is about 3 liters.

As is generally customary in ion-exchange resin processes, it is preferred to utilize the resin in comminuted form (about 40–100 mesh and in a bed-like, columnar arrangement. Although not critical, I find it suitable to employ a column diameter of approximately 4 centimeters to approximately 8 centimeters with a diameter of approximately 5 centimeters being preferred. The number of columns employed is usually merely a matter of convenience, the combined length and resulting capacity constituting the important consideration.

Adsorption of the flavonoid values from the aqueous extract may, therefore, be achieved by simply contacting a sufficient quantity of comminuted resin with the extract. Suitable flow rates thru a bed of the resin, in the preferred columnar arrangement, for effecting adsorption, are from about 10 liters/hour/square decimeter of column cross section (i. e. resin bed area) to about 30 liters/hour/square decimeter of column cross section while a rate of approximately 20 liters/hours/square decimeter of column cross section is preferred.

Numerous organic solvent eluting agents are suitable for removing flavonoid compounds which are adsorbed on resins as herein described. In general, any relatively low molecular weight, aliphatic, organic solvent such as, for example, acetone, ethanol, ethyl acetate, butanol or isopropyl alcohol may be employed. However, in view of its somewhat more efficient and more universal eluting action and relative cheapness, ethanol is preferred.

When utilizing the preferred condition set forth above, it is generally satisfactory to use approximately ½ of a liter of eluting solvent/kilogram of starting material to approximately 6 liters of eluting solvent/kilogram of starting material, the preferred volume depending upon the amount of resin employed and the quantity of flavonoids adsorbed thereon. An eluting solvent flow rate of approximately 10 liters/hour/square decimeter of column cross section to approximately 30 liters/hour/square decimeter of column cross section is usually suitable, while a flow rate of approximately 20 liters/hour/square decimeter of column cross section is preferred.

In a preferred embodiment of my invention, 1 kilogram of a substantially solid flavonoid-containing portion of a plant is finely ground in a ball mill. The resulting comminuted material is then extracted four times with 30 liter portions of boiling water. The resulting combined flavonoid-containing supernatant extract is then separated from the remaining solid residues by filtration thru a flannel bag. The filtered extract is then percolated thru a 5 centimeter diameter column containing approximately 3 liters of wet-settled, comminuted cation-exchange resin (approximately 60–100 mesh), characterized by a plurality of carboxylic groups, at a rate of approximately 4 liters/hour. The adsorbed flavonoid compound may then be eluted from the resin by percolating 4 liters of ethanol thru the multiple columns in approximately one hour.

Occasionally, it is desired to further purify the flavonoids eluted from the resin. The method of my invention is particularly useful for such a purpose. In many cases, the organic eluting solvent may be evaporated, the resulting flavonoid-containing residue taken up in hot water, the metal salt of the flavonoid precipitated by addition of the appropriate metal cation, the resulting precipitate separated and an aqueous solution formed therefrom. Then, by repeating my resin adsorption-elution procedure, the metal cation may be retained on the resin and further-purified flavonoids eluted with an organic solvent.

The following specific examples illustrate my invention in greater detail.

EXAMPLE I

A Pyrex tube, 5 centimeters x 120 centimeters, fitted with No. 12 rubber stoppers was packed with a 5 centimeter layer of glass wool, followed by 5 centimeters of purified sea sand, and then filled to a height of 92 centimeters with a slurry of a cation-exchange resin (Amberlite IRC–50 manufactured by Rohm and Haas Co., Philadelphia, Pa.). For preparation of the hydrogen form of the resin, 3 to 4 liters of 2% hydrochloric acid was passed through the column. The column was then washed with distilled water until the liquid came through neutral.

Two grams of rutin were dissolved in 6 liters of water containing 1 gram of aluminum chloride hexahydrate, resulting in the formation of a bright, yellow aluminum-flavonoid compound in solution. This solution was then passed through the column. The aluminum-flavonoid compound was retained on the column in the form of a light yellow band, approximately 25 centimeters in width at the top of the resin bed. The column was washed with 2 liters of distilled water. The rutin was then eluted by washing the column with ethanol. The aluminum remained on the column.

EXAMPLE II

The ion-exchange system described in Example I was employed.

One gram of rutin was suspended in 2 liters of distilled water and 1 gram of potassium acetate was added, with stirring, until the potassium acetate dissolved. A few drops of ammonium hydroxide were added, drop by drop, with continued stirring until the rutin was completely dissolved as the bright yellow potassium-rutin compound. The resulting solution was then passed through a column of Amberlite IRC–50 (H) at a flow rate of approximately 4 liters per hour. The potassium-rutin was adsorbed in a tight band (5 centimeters to 8 centimeters wide) at the top of the resin bed. The column was thoroughly washed with distilled water—the rutin still remaining on the column.

Two methods were used in the elution of rutin from the column:

(1) The rutin was eluted directly with a 1 liter wash of ethanol, with the potassium remaining on the column, or (2) The potassium was removed by a 1 liter wash with 0.1 N hydrochloric acid solution, followed by 1 liter of distilled water. Finally, to remove the rutin, 1 liter of ethanol was used.

The second method is generally preferred. Inspection of the column after direct elution with ethanol revealed a small residual zone of rutin at the top of the column; but by first disrupting the potassium-rutin, as in the second method, the subsequent alcoholic elution was complete.

EXAMPLE III

The ion-exchange system described in Example I was employed.

The lead salt of morin was prepared by adding a solution of basic lead acetate to an acetone solution of 5 grams of impure morin. The resulting precipitate was filtered, using suction, and washed on the filter with distilled water.

This lead salt precipitate was dissolved in 250 milliliters glacial acetic acid and diluted to 1 liter with distilled water. The resulting solution was passed slowly through the column. A yellow band was formed, covering the upper one-third of the resin. A brown solution came through into the filtrate. The column was washed with about 2 liters of distilled water, until the washings changed from brown to colorless. The morin was then eluted from the column in 500 milliliters of denatured ethanol.

The used column was regenerated, with 5% nitric acid, rather than with the hydrochloric acid, to prevent formation of lead chloride.

EXAMPLE IV

The ion-exchange system described in Example I was employed.

One kilogram of powdered Galanga root (the rhizome of *Alpinia officinarium*) was boiled for two hours with 30 liters of distilled water. The solution was filtered twice through a flannel bag, then 2 liters of the extract was passed through a resin column at a rate of 4 liters per hour. The original aqueous extract had given a positive reduction test. The solution that passed through the column had about the same outward appearance as on entry, but it now gave a negative reduction test.

The extract was followed on the column with a wash of about 4 liters of distilled water. This removed some orange color, but no detectable flavonoid. The filtrate gave a negative reduction test. The column was then washed with 1 liter of denatured ethanol. The first alcohol to come through contained some red impurity which gave a negative reduction test. The flavonoid compounds were eluted in the next 600 milliliters of alcohol, containing some water.

The alcohol-water solution was concentrated to 200 milliliters by distillation. Some finely divided solid precipitated on cooling. Water (300 milliliters) was added, and the flask placed in the refrigerator for four days to allow complete precipitation to occur. After filtration, this light tan colored precipitate was re-dissolved in 1 liter of boiling water and again filtered. A small amount of brown impurity was removed on the filter paper. On cooling the filtrate, a relatively pure flavonoid fraction (galangin and kaempferide) precipitated.

EXAMPLE V

Four columns of the ion-exchange system described in Example I were employed.

One kilogram of ground heartwood of the *Morus tinctoria* tree was extracted four times with 45 liter portions of distilled water. Each extract was boiled for two hours and then filtered through flannel bags.

Approximately 45 liters of the cooled, redbrown extract was passed through each column. The filtrate from the columns was only slightly less colored. The resin bed gradually assumed a yellow-brown tint as the solution passed through. The columns were next washed with distilled water until the filtrate was clear (3 liters). The adsorbed material, including morin, was then eluted with 95% ethyl alcohol. Each column required about one liter of alcohol. The alcohol wash was followed by distilled water in order to flush the last of the alcoholic solution through the resin bed.

Some yellow-brown material moved down the column just in advance of the alcohol-water interface. This material precipitated on leaving the column. It was discarded since it gave negative tests for flavonoid material. The alcoholic filtrates from the four columns were combined and concentrated to about 275 milliliters. Considerable yellow-brown solid material precipitated during the concentration. An equal volume of water was added to the concentrate and the solution set in the refrigerator overnight to allow further precipitation to take place. The yield was 26.4 grams or 2.64% of crude morin.

The crude morin was recrystallized from 900 milliliters of 60% acetic acid solution. The yield was 12 grams or 1.2%. The dried morin was dissolved in a minimum quantity of 95% ethyl alcohol and 15 grams of solid potassium acetate added. A bright yellow precipitate of the potassium salt of morin separated at once. The potassium salt was suspended in approximately 20 liters of distilled water and a few drops of potassium hydroxide solution were added to complete solution. The pH of the resulting solution was approximately neutral.

The solution of the potassium salt was then passed through two fresh columns in order to decompose the complex. The potassium was exchanged for hydrogen ion and the adsorbed morin subsequently eluted with ethyl alcohol. Concentration of the alcoholic solution at reduced pressure and subsequent addition of water yielded pale yellow morin. The yield was 9.5 grams or 0.95%.

Paper partition chromatography of an alcoholic solution of the final product revealed no contamination by other flavonoid or other visible or fluorescent pigments. Mixed chromatograms of this morin with an authentic specimen of morin produced only one pigment zone.

EXAMPLE VI

Four columns of the ion-exchange system described in Example I were employed. Five hundred grams of powdered yerba santa leaves was successively extracted with three 38 liter portions of boiling distilled water in two hour periods. The last extract gave only a very weak test for flavonoid materials. The extracts were filtered through a flannel bag and 21 liters of the extract was passed through each column at a rate of 7.5 liters/hour.

The columns were washed with distilled water as long as any color was removed (about 4 liters/column). The flavonoid material was then eluted by washing each column with approximately 1½ liters of ethyl alcohol. The alcohol solutions were combined, concentrated to 3½ liters in a flash evaporator, diluted with 2½ liters of water, and set in the refrigerator. A brownish-colored tarry mass of crude homoeriodictyol (5, 7,4' - trihydroxy-3'-methoxyflavanone) separated from the solution on standing.

The solution was filtered, and the tarry residue extracted with 1.2 liters of ethyl ether. The ether solution was decanted from a small amount of undissolved black solid and shaken with four 50-milliliter portions of 10% ammonium carbonate solution. This treatment removed a considerable amount of acidic tarry materials. The homoeriodictyol was then precipitated as the insoluble sodium salt by extracting the ether solution with five 90-milliliter portions of 10% sodium carbonate solution. The sodium homoeriodictyate was collected by filtration of the sodium carbonate solution and washed with a small quantity of distilled water.

The sodium salt was dissolved in 3 liters of distilled water and passed through a fresh column. A bright-yellow band of homoeriodictyol formed at the top of the resin bed as the complex was decomposed by hydrogen-sodium exchange. As additional solution was passed through the column, the band broadened in width. The column was washed with 3 liters of distilled water, by which time the filtrate was clear and colorless. The homoeriodictyol was then eluted from the column with ethyl alcohol. The alcohol solution was concentrated to approximately 600 milliliters and then diluted with an equal volume of distilled water. A pale-yellow precipitate of homoeriodictyol separated on standing in the refrigerator. The yield was 14.0 grams to 14.5 grams or 2.8% to 2.9%.

Paper partition chromatography of the final product revealed no evidence of contamination by eriodictyol or other flavonoids. Mixed chromatograms and mixed melting point determinations with authentic homoeriodictyol substantiated the purity and identity of the product.

In general, it may be said that the above examples are merely illustrative and should not be construed as limiting the scope of my invention which should be understood to be limited only as indicated by the appended claims.

I claim:

1. An improved method of separating flavonoids from an aqueous solution containing said flavonoids and extraneous impurities which comprises contacting said aqueous solution with a comminuted cation-exchange resin, separating the resulting flavonoid-depleted solution from the resulting flavonoid-retaining resin and eluting the flavonoids from said resin with an organic solvent.

2. An improved method of obtaining flavonoid values from flavonoid-containing vegetation which comprises comminuting said vegetation, deriving a flavonoid-containing aqueous extract from the resulting comminuted vegetation, passing said extract through a comminuted, cation-exchange resin until the flavonoid values in said extract are substantially completely adsorbed on said resin and eluting the resulting adsorbed flavonoid values with an organic solvent.

3. An improved method of separating a flavonoid compound from an aqueous solution containing a metal compound of same and extraneous impurities which comprises contacting said aqueous solution with a comminuted cation-exchange resin, separating the resulting metal flavonoid-depleted solution from the resulting metal flavonoid-retaining resin, contacting the resulting separated resin with an organic solvent and separating the resulting flavonoid-containing organic solvent from the resulting metal-retaining resin.

4. An improved method of obtaining flavonoid values from a flavonoid-containing portion of a plant which comprises comminuting said plant portion, deriving an aqueous extract from the resulting comminuted portion, passing said flavonoid-containing aqueous extract through a bed of a comminuted cation-exchange resin characterized by a plurality of carboxylic groups, eluting the resulting adsorbed flavonoid values with an organic solvent, adding a metal cation to the resulting flavonoid-containing solvent, separating the resulting metal-flavonoid precipitate from the resulting supernatant solvent, dissolving said separated precipitate in water, passing the resulting solution through a fresh bed of said comminuted resin and eluting the resulting adsorbed flavonoids with an organic solvent.

5. The method of claim 1 where the resin is a weak acid cation-exchange resin characterized by a plurality of active carboxylic groups.

6. The method of claim 1 wherein the organic solvent is ethanol.

7. The method of claim 3 wherein the metal is selected from the group consisting of aluminum, potassium, sodium and lead.

8. The method of claim 1 wherein the flavonoids are selected from the group consisting of rutin, morin, homoeriodictyol, galangin and kaempferide.

9. An improved method of separating flavonoids from an aqueous solution containing said flavonoids and extraneous impurities which comprises passing said aqueous solution through a bed of approximately 1.5 liters to approximately 7.5 liters of a wet-settled comminuted cation-exchange resin characterized by a plurality of active carboxylic groups for about each 5 grams to about 25 grams of flavonoids initially in said extract, at a rate of approximately 10 liters/hour/square decimeter of bed area to about 30 liters/hour/square decimeter of bed area, thereafter passing approximately ½ liter to approximately 6 liters of ethanol for about each 5 grams to about 25 grams of adsorbed flavonoids through the resulting bed of flavonoid retaining resin at a rate of approximately 10 liters/hour/square decimeter of bed area to 30 liters/hour/square decimeter of bed area and collecting the resulting ethanol elutriant containing said flavonoids.

10. An improved method of separating flavonoids from an aqueous solution containing said flavonoids and extraneous impurities which comprises passing said aqueous solution though a bed of approximately 3 liters of a wet-settled comminuted cation-exchange resin characterized by a plurality of active carboxylic groups for about each 10 grams of flavonoids initially in said extract, at a rate of approximately 20 liters/hour/square decimeter of bed area, thereafter passing approximately 4 liters of ethanol for about each 10 grams of adsorbed flavonoids through the resulting bed of flavonoid-retaining resin at a rate of approximately 10 liters/hour/square decimeter and collecting the resulting ethanol elutriant containing said flavonoids.

References Cited in the file of this patent

Nachod: "Ion Exchange" (1949), pp. 277 and 299.